(12) United States Patent
Hallisey et al.

(10) Patent No.: US 12,031,488 B2
(45) Date of Patent: Jul. 9, 2024

(54) COMBUSTION ENGINE INCLUDING TURBOMACHINE

(71) Applicant: GE Aviation Systems LLC, Grand Rapids, MI (US)

(72) Inventors: Kevin P. Hallisey, Ave Maria, FL (US); Dominique Patrick Sautron, Chicago, IL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 18/189,670

(22) Filed: Mar. 24, 2023

(65) Prior Publication Data

US 2023/0250764 A1   Aug. 10, 2023

Related U.S. Application Data

(63) Continuation of application No. 17/362,124, filed on Jun. 29, 2021, now Pat. No. 11,619,177, which is a
(Continued)

(51) Int. Cl.
*F02C 9/18* (2006.01)
*B64D 13/06* (2006.01)
(Continued)

(52) U.S. Cl.
CPC ............... *F02C 9/18* (2013.01); *B64D 13/06* (2013.01); *B64D 27/10* (2013.01); *B64D 29/00* (2013.01);
(Continued)

(58) Field of Classification Search
CPC .... F02C 7/14; F02C 7/18; F02C 7/185; F02C 6/08; F02C 9/18; F02C 7/224; F05D 2260/213; B64D 2013/0618
See application file for complete search history.

(56) References Cited

U.S. PATENT DOCUMENTS 2,800,002 A   7/1957  Seed
3,441,045 A   4/1969  Malone
(Continued)

FOREIGN PATENT DOCUMENTS

CN   102341590 A   2/2012
CN   104343538 A   2/2015
(Continued)

OTHER PUBLICATIONS

U.S. Department of Transportation, Federal Aviation Administration, "Airplane Flying Handbook", 2004, 26 pages, US.
(Continued)

*Primary Examiner* — Thuyhang N Nguyen
(74) *Attorney, Agent, or Firm* — Christine M. Klimczak

(57) ABSTRACT

A combustion engine including a combustion chamber, a first bleed air supply, a second bleed air supply, a thermal bus and a turbomachine. The first bleed air supply being fluidly coupled to a first fluid from a portion of the combustion engine upstream of the combustion chamber. The second bleed air supply being fluidly coupled to a second fluid portion of the combustion engine downstream of the combustion chamber. The turbomachine having a compressor and a turbine. The compressor being fluidly coupled to the first bleed air supply. The turbine being fluidly coupled to the second bleed air supply.

20 Claims, 4 Drawing Sheets

Related U.S. Application Data continuation of application No. 17/091,156, filed on Nov. 6, 2020, now Pat. No. 11,486,315.

(51) Int. Cl.
  *B64D 27/10* (2006.01)
  *B64D 29/00* (2006.01)
  *F04D 27/02* (2006.01)

(52) U.S. Cl.
  CPC .. *F04D 27/0207* (2013.01); *B64D 2013/0618* (2013.01); *F05D 2260/606* (2013.01)

(56) References Cited

U.S. PATENT DOCUMENTS

| | | | |
|---|---|---|---|
| 4,262,495 A | 4/1981 | Gupta et al. | |
| 4,378,920 A | 4/1983 | Runnels et al. | |
| 4,503,666 A | 3/1985 | Christoff | |
| RE32,100 E | 4/1986 | Rannenberg | |
| 4,684,081 A | 8/1987 | Cronin | |
| 5,036,678 A | 8/1991 | Renninger et al. | |
| 5,086,622 A | 2/1992 | Warner | |
| 5,143,329 A | 9/1992 | Coffinberry | |
| 5,255,505 A | 10/1993 | Cloyd et al. | |
| 5,452,573 A | 9/1995 | Glickstein et al. | |
| 5,813,630 A | 9/1998 | Williams | |
| 5,899,085 A * | 5/1999 | Williams | B64D 13/06 62/236 |
| 5,899,805 A | 5/1999 | Dowd et al. | |
| 5,967,461 A | 10/1999 | Farrington | |
| 6,189,324 B1 | 2/2001 | Williams et al. | |
| 6,526,775 B1 | 3/2003 | Asfia et al. | |
| 6,629,428 B1 | 10/2003 | Murry | |
| 6,681,592 B1 | 1/2004 | Lents et al. | |
| 6,796,131 B2 | 9/2004 | Sampson | |
| 6,942,183 B2 | 9/2005 | Zywiak | |
| 6,948,331 B1 * | 9/2005 | Ho | B64D 13/06 62/401 |
| 7,607,318 B2 | 10/2009 | Lui et al. | |
| 7,618,008 B2 | 11/2009 | Scherer et al. | |
| 8,461,710 B1 | 6/2013 | Brostmeyer | |
| 8,904,805 B2 | 12/2014 | Hipsky et al. | |
| 8,955,794 B2 | 2/2015 | Mackin et al. | |
| 8,967,528 B2 | 3/2015 | Mackin et al. | |
| 9,021,780 B2 | 5/2015 | Bowman et al. | |
| 9,394,803 B2 | 7/2016 | Suciu et al. | |
| 9,752,462 B1 | 9/2017 | Fletcher | |
| 9,810,050 B2 | 11/2017 | Sites et al. | |
| 9,879,610 B2 * | 1/2018 | Moes | B64D 13/08 |
| 9,957,051 B2 | 5/2018 | Bruno et al. | |
| 10,160,547 B2 | 12/2018 | Bruno et al. | |
| 10,184,494 B2 | 1/2019 | Army et al. | |
| 10,247,100 B2 | 4/2019 | Leamy et al. | |
| 10,294,873 B2 | 5/2019 | Papa et al. | |
| 10,358,221 B2 | 7/2019 | Sautron | |
| 10,550,770 B2 | 2/2020 | Foutch et al. | |
| 11,022,037 B2 | 6/2021 | Niergarth et al. | |
| 11,066,999 B2 | 7/2021 | Sodaro et al. | |
| 11,174,789 B2 | 11/2021 | Rambo et al. | |
| 11,236,675 B2 | 2/2022 | Snape | |
| 2012/0000205 A1 * | 1/2012 | Coffinberry | B64D 13/06 60/806 |
| 2013/0187007 A1 | 7/2013 | Mackin et al. | |
| 2014/0250898 A1 | 9/2014 | Mackin et al. | |
| 2015/0059397 A1 | 3/2015 | Bruno et al. | |
| 2015/0065023 A1 | 3/2015 | Bruno | |
| 2015/0176501 A1 * | 6/2015 | Mackin | F02C 6/08 415/144 |
| 2015/0247463 A1 | 9/2015 | DeFrancesco | |
| 2015/0251765 A1 | 9/2015 | Jonqueres et al. | |
| 2016/0090917 A1 | 3/2016 | Bruno et al. | |
| 2017/0233081 A1 | 8/2017 | Sautron et al. | |
| 2017/0233083 A1 * | 8/2017 | Behrens | F02C 7/224 62/79 |
| 2018/0057170 A1 | 3/2018 | Sautron | |
| 2018/0057171 A1 * | 3/2018 | Sautron | F02C 9/18 |
| 2018/0057172 A1 | 3/2018 | Sautron | |
| 2018/0080383 A1 * | 3/2018 | Snape | F02C 6/08 |
| 2018/0094584 A1 * | 4/2018 | Chalaud | F04C 23/005 |
| 2018/0266330 A1 | 9/2018 | Widener | |
| 2019/0040876 A1 | 2/2019 | Army et al. | |
| 2019/0162121 A1 | 5/2019 | Staubach et al. | |
| 2019/0218971 A1 | 7/2019 | Niergarth et al. | |

FOREIGN PATENT DOCUMENTS

| | | |
|---|---|---|
| CN | 104520660 A | 4/2015 |
| CN | 110005529 A | 7/2019 |
| CN | 110043332 A | 7/2019 |
| CN | 110529256 A | 12/2019 |
| EP | 2339296 A2 | 6/2011 |
| EP | 2845803 A1 | 3/2015 |
| EP | 2862803 B1 | 11/2016 |
| EP | 2966278 B1 | 4/2018 |
| EP | 2918497 B1 | 11/2018 |
| EP | 3002431 B1 | 7/2019 |

OTHER PUBLICATIONS

S. Chiesa et al., "Turbojet Analytical Model Development and Validation", Sep. 23-28, 2012, 10 pages.

Interpreting Piping and Instrumentation Diagrams—Symbology, Jan. 8, 2015, 1 page.

EDRAW, Standard Process Flow Diagram Symbols and Their Usage, Mar. 12, 2015, 5 pages.

* cited by examiner

COMBUSTION ENGINE INCLUDING TURBOMACHINE

CROSS REFERENCE TO RELATED APPLICATIONS

This application claims priority to U.S. patent application Ser. No. 17/362,124, filed Jun. 29, 2021, now allowed, which claims priority to U.S. patent application Ser. No. 17/091,156, filed Nov. 6, 2020, now U.S. Pat. No. 11,486, 315, issued Nov. 1, 2022, each of which is incorporated herein by reference in its entirety.

TECHNICAL FIELD

This disclosure generally relates to a combustion engine, and more specifically a combustion engine of an aircraft including a turbomachine.

BACKGROUND

Combustion engines, specifically gas or combustion gas turbine engines, are rotary engines that extract energy from a flow of combusted gases passing through the engine onto a multitude of rotating turbine blades.

A gas turbine engine includes but is not limited to, in serial flow arrangement, a fan section, a compressor section, a combustion section, and a turbine section. The compressor, combustor and turbine sections are sometimes collectively referred to as the core engine.

Gas turbine engines can further include or otherwise be coupled to a turbomachine which can used to generate electricity for the aircraft or provide the work force for operating aircraft systems, like the environmental control system, such as the air conditioning system.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
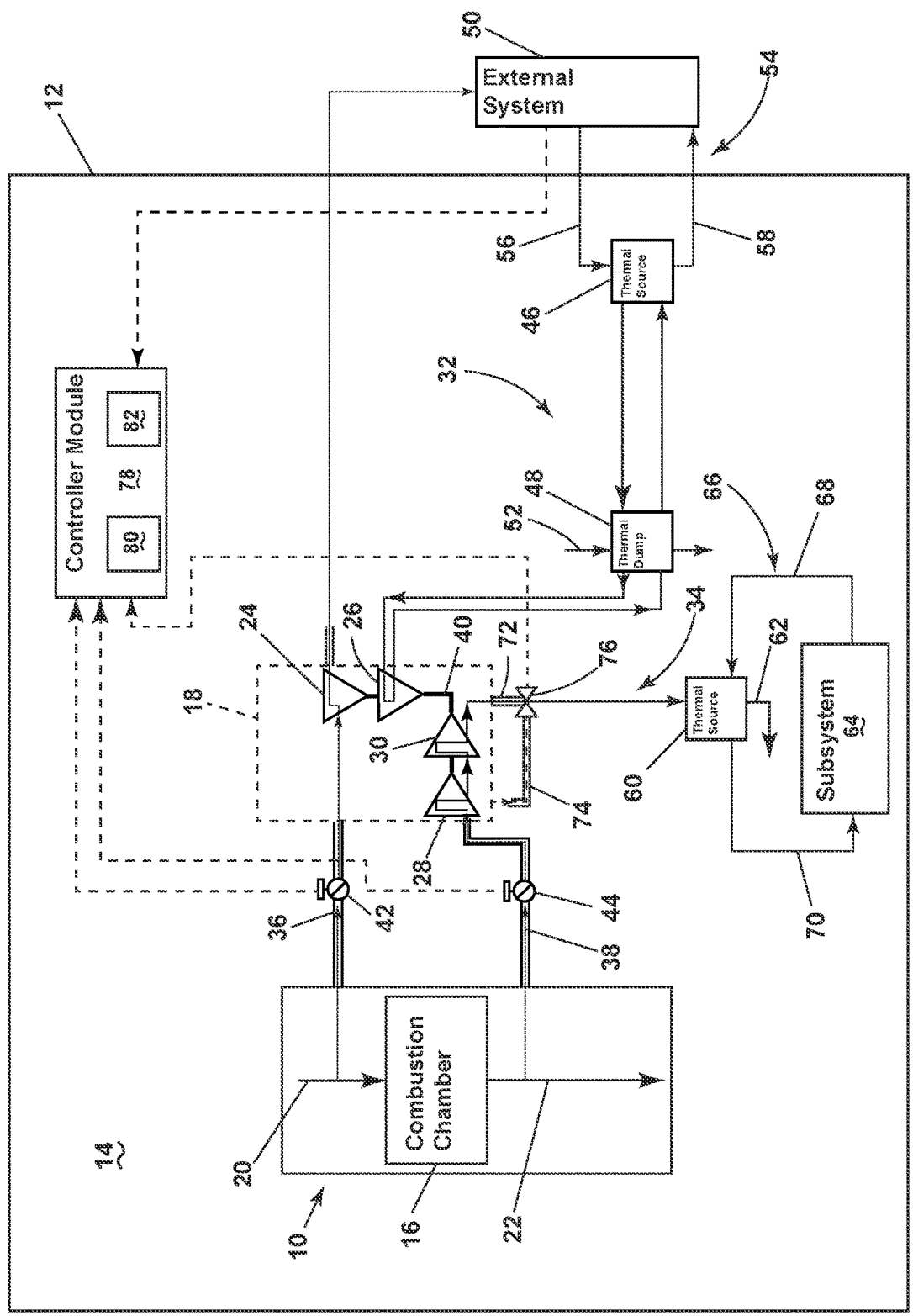
FIG. 1 is a schematic view of a combustion engine including a turbomachine according to various aspects described herein.

Aspects of the disclosure described herein are directed to a combustion engine including a combustion chamber and a set of bleed air supplies fluidly coupled to a turbomachine. Specifically, a first bleed air supply fluidly coupled to a portion of the combustion engine upstream the combustion chamber and a second bleed air supply fluidly coupled to a portion of the combustion engine downstream the combustion chamber. As used herein, the term "combustion engine" can refer to any suitable engine configured to take a fluid (e.g., air), inject a fuel into the fluid to form a fuel and fluid mixture and subsequently combust the mixture within the combustion chamber to produce a working fluid that can be used to output a physical work from the combustion engine. For example, the combustion engine can be a gas turbine engine including a combustor section configured to combust a compressed fluid from a compressor section of the gas turbine engine and output a combusted fluid to a turbine section of the gas turbine engine to produce a physical work of the gas turbine engine. In terms of the gas turbine engine, the first bleed air supply can be fluidly coupled to a fan section or compressor section upstream the combustor section of the gas turbine engine, while the second bleed air supply can be fluidly coupled to a turbine section or an exhaust section downstream the combustor section of the gas turbine engine.

As used herein, the term "turbomachine" can refer to any suitable system included within the combustion engine including at least a turbine and a compressor, each configured to receive a fluid from at least a portion of the combustion engine. The turbomachine can include a compressor fluidly coupled to the first bleed air supply, a rotary pump provided downstream the compressor, a first turbine fluidly coupled to the second bleed air supply, and a second turbine provided downstream the first turbine. The combustion engine can further include thermal bus and a second thermal bus, each fluidly coupled to at least a portion of the turbomachine. The first and second thermal busses can each include a heat transfer fluid, with the heat transfer fluid within the first thermal bus being a liquid heat transfer fluid and the heat transfer fluid of the second thermal bus being a gaseous heat transfer fluid. Both the first and second thermal busses can be configured to draw heat from or otherwise cool at least one system exterior of or provided within the combustion engine. It is contemplated that least a portion of the turbomachine can be fluidly coupled to at least the first thermal bus or the second thermal bus. It will be appreciated that each the first and second bleed air supplies can be selectively fluidly coupled to at least a portion of the turbomachine or other portions of the combustion engine through a set of valves.

The first thermal bus can a thermal source and a thermal dump. The thermal source can be configured to draw heat from a suitable system of the combustion engine or a system external the combustion engine, while the thermal dump can be configured to transfer the heat drawn from the suitable system to a cooler fluid (e.g., ambient air). The entirety of the first thermal bus can be included within the housing of the combustion engine. In terms of the gas turbine engine for an aircraft, the first thermal bus can be provided within at least one of a nacelle, casing, pylon, or housing of the gas turbine engine. The second thermal bus can include a subsystem thermal dump configured to draw heat from a subsystem, and a subsystem thermal exhaust configured to exhaust the heat transfer fluid within the first thermal bus to an exhaust section of the combustion engine or exterior the combustion engine. Similar to the first thermal bus, the second thermal bus can be included within the housing of the combustion engine or within the nacelle, pylon, housing, or casing of the gas turbine engine provided on an aircraft.

The entirety of the turbomachine along with the first and second thermal busses, can be integrally formed within an interior of the combustion engine. This ultimately reduces the weight and overall size of the combustion engine. In terms of the gas turbine engine for the aircraft, not only is the weight reduced through implementation of the turbomachine, the first thermal bus, and the second thermal bus, but the drag of the aircraft is also reduced. For example, the integration of the integration of the first thermal bus can eliminate the need for a RAM air heat sink scoop. This, in turn, can reduce the weight, emitted heat, and drag of the aircraft when compared to conventional aircraft. Further yet, the second thermal bus can utilize engine exhaust gases or other waste heat of the combustion engine to cool various external systems or subsystems of the combustion engine (i.e., a fuel system, or an oil system) without a negative impact from using engine exhaust gases to draw heat from the subsystem.

While the description will generally pertain to a combustion engine, and more specifically to a gas turbine engine included on an aircraft, it will be appreciated that the combustion engine can be any suitable combustion engine such as, but not limited to, a compression ignition engine, a spark ignition engine, a gas turbine engine, a Liquified Natural Gas (LNG) engine, or the like. In terms of the gas turbine engine, it will be appreciated that the gas turbine engine can be any suitable gas turbine engine such as, but not limited to, a counter-rotating gas turbine engine, a propfan gas turbine engine, a turbojet gas turbine engine, a turboprop gas turbine engine, or the like. Therefore, the combustion engine as described herein will also have applicability in other environments where combustion engines can be used such as, but not limited to, aircraft, non-aircraft, terrestrial, as well as any other suitable environments.

As used herein, the terms "radial" or "radially" refer to a direction away from a common center. For example, in the overall context of a gas turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, fixed, connected, joined, and the like) are to be construed broadly and can include intermediate members between a collection of elements and relative movement between elements unless otherwise indicated. As such, connection references do not necessarily infer that two elements are directly connected and in fixed relation to one another. The singular forms "a," "an," and "the" include plural references unless the context clearly dictates otherwise.

As used herein, the term "additive manufacturing" generally refers to manufacturing processes wherein successive layers of material(s) are provided on each other to "build-up," layer-by-layer, a three-dimensional component. The successive layers generally fuse together to form a monolithic unitary component, which can have a variety of integral sub-components.

Suitable additive manufacturing techniques in accordance with the present disclosure include, for example, Directed Energy Deposition (DED), Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

In addition, it will be appreciated that a variety of materials and methods for bonding those materials can be used and are contemplated as within the scope of the present disclosure. As used herein, references to "fusing" can refer to any suitable process for creating a bonded layer of any of the above materials. For example, if an object is made from polymer, fusing can refer to creating a thermoset bond between polymer materials. If the object is epoxy, the bond can be formed by a crosslinking process. If the material is ceramic, the bond can be formed by a sintering process. If the material is powdered metal, the bond can be formed by a melting or sintering process. One skilled in the art will appreciate that other methods of fusing materials to make a component by additive manufacturing are possible, and the presently disclosed subject matter can be practiced with those methods.

In addition, the additive manufacturing process disclosed herein allows a single component to be formed from multiple materials. Thus, the components described herein can be formed from any suitable mixtures of the above materials. For example, a component can include multiple layers, segments, or parts that are formed using different materials, processes, or on different additive manufacturing machines. In this manner, components can be constructed which have different materials and material properties for meeting the demands of any particular application. In addition, although the components described herein are constructed entirely by additive manufacturing processes, it should be appreciated that in additional aspects of the present disclosure, all or a portion of these components can be formed via casting, machining, or any other suitable manufacturing process. Indeed, any suitable combination of materials and manufacturing methods can be used to form these components.

An exemplary additive manufacturing process will now be described. Additive manufacturing processes fabricate components using three-dimensional (3D) information, for example a three-dimensional computer model, of the component. Accordingly, a three-dimensional design model of the component can be defined prior to manufacturing. In this regard, a model or prototype of the component can be scanned to determine the three-dimensional information of the component. As another example, a model of the component can be constructed using a suitable computer aided design (CAD) program to define the three-dimensional design model of the component.

The design model can include 3D numeric coordinates of the entire configuration of the component including both external and internal surfaces of the component. For example, the design model can define the body, the surface, or internal passageways such as passageways, voids, support structures, etc. In one exemplary non-limiting example, the three-dimensional design model is converted into a set of slices or segments, e.g., along a central (e.g., vertical) axis of the component or any other suitable axis. Each slice can define a thin cross section of the component for a predetermined height of the slice. The set of successive cross-sectional slices together form the 3D component. The component is then "built-up" slice-by-slice, or layer-by-layer, until finished.

In this manner, the components described herein can be fabricated using the additive process, or more specifically each layer is successively formed, e.g., by fusing or polymerizing a plastic using laser energy or heat or by sintering or melting metal powder. For example, a particular type of additive manufacturing process can use an energy beam, for example, an electron beam or electromagnetic radiation such as a laser beam, to sinter or melt a powder material. Any suitable laser and laser parameters can be used, including considerations with respect to power, laser beam spot size, and scanning velocity. The build material can be formed by any suitable powder or material selected for enhanced strength, durability, and useful life, particularly at high temperatures.

Each successive layer can be, for example, between about 10 μm and 200 μm, although the thickness can be selected based on any number of parameters and can be any suitable size according to alternative aspects of the present disclosure. Therefore, utilizing the additive formation methods described above, the components described herein can have cross sections as thin as one thickness of an associated powder layer, e.g., 10 μm, utilized during the additive formation process.

In addition, utilizing an additive process, the surface finish and features of the components can vary as need depending on the application. For example, the surface finish can be adjusted (e.g., made smoother or rougher) by selecting appropriate laser scan parameters (e.g., laser power, scan speed, laser focal spot size, etc.) during the additive process, especially in the periphery of a cross-sectional layer, which corresponds to the part surface. For example, a rougher finish can be achieved by increasing laser scan speed or decreasing the size of the melt pool formed, and a smoother finish can be achieved by decreasing laser scan speed or increasing the size of the melt pool formed. The scanning pattern or laser power can also be changed to change the surface finish in a selected area.

The exemplary drawings are for purposes of illustration only and the dimensions, positions, order and relative sizes reflected in the drawings attached hereto can vary.

FIG. 1 illustrates a combustion engine 10 including a housing 12 defining an interior 14, a combustion chamber 16, and a turbomachine 18. The combustion engine 10 can be defined by an upstream portion 20 and a downstream portion 22 with respect to the combustion chamber 16. The turbomachine 18, as described herein, can include a compressor 24, a rotary pump 26, a first turbine 28, and a second turbine 30. A first thermal bus 32 can be fluidly coupled to the rotary pump 26, while a second thermal bus 34 can be fluidly coupled to at least one of the first and second turbines 28, 30. As illustrated, the turbomachine 18, the first thermal bus 32, and the second thermal bus 34 can all be received within the interior 14 defined by the housing 12 of the combustion engine 10. It will be further appreciated, however, that at least a portion of the turbomachine 18, the first thermal bus 32, or the second thermal bus 34 can be received within other portions of the combustion engine 10 such as, for example, a drive shaft of the combustion engine 10.

A first bleed air supply 36 and a second bleed air supply 38 can each fluidly coupled at least a portion of the combustion engine 10 to a corresponding portion of the turbomachine 18. Specifically, the first bleed air supply 36 can fluidly couple the compressor 24 of the turbomachine 18 to the upstream portion 20 of the combustion engine 10, while the second bleed air supply 38 can fluidly couple the first turbine 28 to the downstream portion 22 of the combustion engine 10. As such, the compressor 24 can be fluidly coupled to a portion of the combustion engine 10 upstream the combustion chamber 16, and the first turbine 28 can be fluidly coupled to a portion of the combustion engine 10 downstream the combustion engine 10. It will be further appreciated that the fluid flowing within the first and second bleed air supplies 36, 38 can be further defined by their contaminates. For example, during the combustion process, fluid flows into the combustion chamber 16 from the upstream portion 20 where it is subsequently mixed with fuel and combusted. This process creates engine exhaust gases or combustion gases that are transferred to the downstream portion 22 of the combustion engine 10. As the fluid from the first bleed air supply 36 comes from the upstream portion 20, it does not contain exhaust gases. Conversely, the fluid from the second bleed air supply 38 contains engine exhaust gases as it comes from the downstream portion 22 of the combustion engine 10.

The second compressor 26 can be serially fluidly coupled to the first compressor 24 downstream of the first compressor 24. As such, the first and second compressors 24, 26 can be serially fluidly coupled to at least a portion of the upstream portion 20 of the combustion engine 10. Similarly, the second turbine 30 can be serially fluidly coupled to the first turbine 28 downstream of the first turbine 28. As such, the first and second turbines 28, 30 can be serially fluidly coupled to at least a portion of the downstream portion 22 of the combustion engine 10.

The compressor 24, the rotary pump 26, the first turbine 28, and the second turbine 30 of the turbomachine 18 can each be drivingly or operably coupled to one another through a common shaft 40. The rotation of the first and second turbines 28, 30 can drive the rotation of the compressor and rotary pump 24, 26 through rotation of the common shaft 40. Alternatively, the common shaft 40 can include a first and second shafts. The first shaft can operatively or drivingly couple the first turbine 28 to the compressor 24, while the second shaft can operatively or drivingly couple the second turbine 30 to the rotary pump 26. In such a case, it is contemplated that the first shaft can be received within the second shaft.

The first and second bleed air supplies 36, 38 can be fluidly coupled to at least a portion of the turbomachine 18 by way of a first valve 42, and a second valve 44, respectively. The first and second valves 42, 44 can operate in response to, related to, or as a function of the combustion engine 10 operational phase or the rotational speed of the combustion engine 10. For example, the rotational speed of the combustion engine 10 can vary within an operating cycle, during which the first and second valves 42, 44 can be adjusted based on combustion engine 10 transient or dynamic conditions in order to supply the needed amount of fluid through the first and second bleed air supplies 36, 38 to the turbomachine 18.

The first thermal bus 32 and the second thermal bus 34 can each include a heat transfer fluid. Specifically, the first thermal bus 32 can include a liquid heat transfer fluid while the second thermal bus 34 can include a gaseous heat transfer fluid. It is contemplated that the gaseous heat transfer fluid can be the engine exhaust gases within the first or second turbines 28, 30 from the second bleed air supply 38.

The first thermal bus 32 can be further defined as a thermal loop, which transfers the heat transfer fluid such that it can flow through the first thermal bus 32. The heat transfer fluid can be pressurized or otherwise pumped through the first thermal bus 32 by the being channeled through at least a portion of the rotary pump 26. In other words, the rotary pump 26 can pressurize the heat transfer fluid within the first thermal bus 32 in order to pump the heat transfer fluid through the entirety of the first thermal bus 32.

The first thermal bus 32 can further include a thermal source 46 and a thermal dump 48 fluidly coupled to one another and which the heat transfer fluid flow through. At least a portion of an external system 50 can be fluidly coupled to the to the thermal source 46, while the thermal dump 48 can be fluidly coupled to an ambient airflow 52. As used herein, the term "external system" can refer to any system that is external the combustion engine 10 and configured to receive an output from at least a portion of the combustion engine 10, specifically the turbomachine 18 As a non-limiting example, the external system 50 can be an Environmental Control System (ECS) for a suitable environment (e.g., a vehicle, a building, an aircraft, etc.), or any other suitable external system 50. The external system 50 can be fluidly coupled to the thermal source 46 through an external system fluid flow 56 defining an external system thermal loop. The external system fluid flow 56 can be defined by a first fluid flow 56 that flows from at least a portion of the external system 50 to the thermal source 46 and a second fluid flow 58 that flows from the thermal source 46 to at least a portion of the external system 50.

The second thermal bus 34 can include a thermal source 60 or a subsystem thermal source, and a thermal bus exhaust 62. At least a portion of a subsystem 64 can be fluidly coupled to a portion of the second thermal bus 34 such that the second thermal bus 34 can be further defined as a subsystem thermal bus. As used herein, the term "subsystem" can refer to any system received within the interior 14 of the housing 12. Specifically, the subsystem 64 can be a system of the combustion engine 10 such as, but not limited to, a fuel system, an oil system, or the like. The subsystem 64 can be fluidly coupled to the second thermal bus 34 through a subsystem fluid flow 66 defining a subsystem thermal loop. The subsystem fluid flow 66 can be defined by first subsystem fluid flow 68 that flows from at least a portion of the subsystem 64 to the thermal source 60 and a second subsystem fluid flow 70 that flows from the thermal source 60 to at least a portion of the subsystem 64. It is contemplated that the thermal bus exhaust 62 can be fluidly coupled to an exhaust section of the combustion engine 10 or to an exterior portion of the combustion engine 10. As such, the thermal bus exhaust 62 can be defined as a subsystem thermal dump as it is a portion of the second thermal bus 34 configured to exhaust, or otherwise dump the heat transfer fluid within the second thermal bus 34 to the exhaust section of the combustion engine 10 or exterior the combustion engine 10.

It is contemplated that the thermal source 46, the thermal dump 48, and the thermal source 60 can include any suitable heat transfer device. For example, the thermal source 46, the thermal dump 48, and the thermal source 60 can all be heat exchangers configured to transfer or exchange heat from the heat transfer fluid within the first or second thermal busses 32, 34 to a corresponding fluid that is fluidly coupled to the thermal source 46, the thermal dump 48, or the thermal source 60.

As illustrated, the first and second turbines 28, 30 can be directly fluidly coupled to a main fluid path 72 and a fluid bypass 74, respectively. The main fluid path 72 and the fluid bypass 74 can be fluidly coupled to a mixing valve 76 such that engine exhaust gases from the first and second turbines 28, 30 can mix and be supplied to the second thermal bus 34 to define the heat transfer fluid of the second thermal bus 34. The mixing valve 76 can be further defined as or otherwise include a variable flow rate mixing valve. As such, the engine exhaust gases entering the mixing valve 76 from the fluid bypass 74 and the main fluid path 72 can be selectively supplied to the mixing valve 76. The engine exhaust gas can then flow through the mixing valve 76 and into the second thermal bus 34.

The combustion engine 10 can further include a controller module 78 having a processor 80 and a memory 82. The controller module 78 or processor 80 can be operably or communicatively coupled to various portions of the system described herein, such as, for example, the external system 50, the subsystem 64, the first and second valves 42, 44, the mixing valve 76, or the like. It will be further appreciated that sensors can be provided through the combustion engine 10 to measure various characteristics of the combustion engine 10 or components thereof. For example, a sensor can be located upstream of, downstream of, or within the thermal source 46 in order to monitor or measure the temperature of the heat transfer fluid within the first thermal bus 32. It will be appreciated that the controller module 78 can be configured to selectively operate first and second valves 42, 44 to selectively supply or otherwise limit the fluid flow between the combustion engine 10 to a corresponding portion of the turbomachine 18. The controller module 78 can further selectively supply or otherwise limit the amount of engine exhaust gases from the first turbine 28 and the second turbine 30 which enter the mixing valve 76 via control of the second valve 44. The memory 82 can include random access memory (RAM), read-only memory (ROM), flash memory, or one or more different types of portable electronic memory, such as discs, DVDs, CD-ROMs, etc., or any suitable combination of these types of memory. The controller module 78 or processor 80 can further be configured to run any suitable programs. Non-limiting embodiments of the disclosure can be included wherein, for example, the controller module 78 or processor 80 can also be connected with other controllers, processors, or systems of the combustion engine 10, or can be included as part of or a subcomponent of another controller, processor, or system of the combustion engine.

In operation, the turbomachine 18 can receive a first and a second fluid flow from the first bleed air supply 36 and the second bleed air supply 38, respectively. As discussed herein, the first bleed air supply 36 is fluidly coupled to the upstream portion 20 of the combustion engine 10, thus the first fluid flow is defined as a fluid flow without engine exhaust gases. The second bleed air supply 38 is fluidly coupled to a downstream portion 22 of the combustion engine 10, thus the second fluid flow is defined as a fluid flow with engine exhaust gases. It will be further appreciated that the first and second fluid flows can be defined by at least their temperature. Specifically, the second fluid flow can be at a higher temperature than the first fluid flow due to the fact that the combustion chamber 16 introduces heat into the system through the combustion process. As such, a fluid flow within the downstream portion 22 of the combustion engine 10 will be hotter than a fluid flow within the upstream portion 20.

As such, during operation of the combustion engine 10 a hot fluid flow or engine exhaust gases from the downstream portion 22 of the combustion engine 10 can enter the turbomachine 18 via the second bleed air supply 38. Specifically, the engine exhaust gases can be delivered directly to the first turbine 28. As the first turbine 28 is serially fluidly coupled to the second turbine 30, the first turbine 28 can supply the engine exhaust gases to the second turbine 30. As the engine exhaust gases go from the first turbine 28 to the second turbine 30, work is extracted and the common shaft 40 is rotated. As a result of the work done as the engine exhaust gases move through the first and second turbines 28, 30, the engine exhaust gases in the second turbine 30 can be defined as a low-temperature and low-pressure engine exhaust gas when compared to the engine exhaust gases in the first turbine 28. The rotation of the common shaft 40 can subsequently rotate other portions of the turbomachine 18, specifically the compressor and rotary pump 24, 26. At least one of the compressor or rotary pump 24, 26 can be fluidly coupled to the first bleed air supply 36 such that the first fluid flow from the upstream portion 20 be drawn into the turbomachine 18. As the first fluid flow enters the compressor 24, it can be diverted to the external system 50. It is contemplated that the first fluid flow can be used by the external system 50 for the operation of external system 50. For example, in terms of the external system 50 being the ECS, the first fluid flow can be used as an environmental air supply (e.g., air supplied to a cabin of an aircraft). The air and engine exhaust gases supplied via the first and second bleed air supplies 36, 38, respectively, can be selectively supplied to the turbomachine 18 via the first and second valves 42, 44 by the controller module 78. For example, if it is desired for the turbomachine 18 to output more work, then the second valve 44 can be fully engaged or opened via the controller module 78 to allow for a maximum amount of engine exhaust gases to drive the first and the second turbines 28, 30. Similarly, if the external system 50 needs a lower fluid flow (e.g., a lower demand for the environmental air supply), then the first valve 42 can be limited or otherwise closed via the controller module 78 to limit the fluid flow going through the compressor 24 of the turbomachine 18 and to the external system 50.

The rotation at least a portion of the turbomachine 18 can drive or the heat transfer fluid through at least the first and second thermal busses 32, 34. In regards to the first thermal bus 32, the rotation of the rotary pump 26 can drive the heat transfer fluid defined as a liquid coolant within the first thermal bus 32 through the thermal dump 48 and the serially fluidly connected thermal source 46. In regards to the second thermal bus 34, the rotation of the first and second turbines 28, 30 can supply engine exhaust gases to the fluid bypass 74 and the main fluid path 72, respectively. The mixing valve 76, controlled via the controller module 78, can then selectively supply engine exhaust gas from the first turbine 28, the second turbine 30, or a combination thereof to the second thermal bus 34, and subsequently to the thermal source 60. The engine exhaust gases can be defined as the heat transfer fluid of the second thermal bus 34.

In operation, the heat transfer fluid entering the thermal source 46 of the first thermal bus 32 draws heat from the external system 50. Specifically, the heat transfer fluid within the thermal source 46 draws heat from the first fluid flow 56 of the external system fluid flow 56. The heat transfer fluid of the first thermal bus 32 that flows into the thermal source 46 can be colder than the first fluid flow 56 such that heat is transferred from the first fluid flow 56 to the heat transfer fluid within the thermal source 46 as the first fluid flow 56 flows through the thermal source 46. As such, the heat transfer fluid of the first thermal bus 32 leaving the thermal source 46 can be hotter than the heat transfer fluid that enters the thermal source 46, and the first fluid flow 56 can be hotter than the second fluid flow 58 leaving the thermal source 46. The second fluid flow 58 can subsequently be directed back into the external system 50. As such, the thermal source 46 can provide a cooled fluid flow (e.g., the second fluid flow 58) to the external system 50 by drawing heat from a heated fluid flow (e.g., the first fluid flow 56) into the heat transfer fluid of the first thermal bus 32. The heat transfer fluid that is heated by the thermal source 46 can subsequently be sent through the thermal dump 48 where the heat within the heat transfer fluid can be transferred or otherwise dumped into the ambient airflow 52 fluidly coupled to the thermal dump 48. The heat transfer fluid leaving the thermal dump 48 can then be directed toward the rotary pump 26 where the heat transfer fluid can be pressurized and pumped through the first thermal bus 32 back through the thermal dump 48 and ultimately into the thermal source 46.

In operation, the heat transfer fluid defined as engine exhaust gases are provided to the thermal source 60 of the second thermal bus 34 through rotation of the first and second turbines 28, 30. The temperature of the exhaust gases entering the thermal source 60 can be controlled via the controller module 78 and mixing valve 76. For example, it is contemplated, that the main fluid path 72 can be defined as an always open path in which at least a portion of the engine exhaust gases from the second turbine 30 are always supplied to the second thermal bus 34. If it is desired that the engine exhaust gases being supplied to the second thermal bus 34 are of a higher temperature, the mixing valve 76 can be at least partially opened via the controller module 78 to selectively supply engine exhaust gases from the fluid bypass 74 to mix with the engine exhaust gases within the main fluid path 72. As the engine exhaust gases lower in temperature as they flow from the first turbine 28 to the second turbine 30, the injection of engine exhaust gases through the mixing valve 76 can raise the temperature of the engine exhaust gases supplied to the second thermal bus 34. Alternatively, it will be appreciated, that both the main fluid path 72 and the fluid bypass 74 can be selectively fluidly coupled to the second thermal bus 34 via the controller module 78. As such, it is contemplated that engine exhaust gases from only the first turbine 28 can be supplied to the second thermal bus 34 by fully disengaging or closing off the main fluid path 72 such that engine exhaust gases within the second turbine 30 do not make it through the mixing valve 76 and into the second thermal bus 34. The engine exhaust gases within the second thermal bus 34 can be fluidly coupled to the thermal source 60 and draw heat from the subsystem fluid flow 66. Specifically, the engine exhaust gases entering the thermal source 60 can be at a lower temperature than the first subsystem fluid flow 68 of the subsystem fluid flow 66. As such, the thermal source 60 can provide a cooled fluid flow (e.g., the second subsystem fluid flow 70) to the subsystem 64 by drawing heat from a heated fluid flow (e.g., the first subsystem fluid flow 68) into the heat transfer fluid of the second thermal bus 34. The second subsystem fluid flow 70 can then be directed back into the subsystem 64 to be utilized by the subsystem 64. The engine exhaust gases leaving the thermal source 60 can thus be hotter than the engine exhaust gases that entered the thermal source 60 and drew heat from the subsystem fluid flow 66. The engine exhaust gases leaving the thermal source 60 can ultimately be exhausted to the atmosphere (exterior the housing 12), or be injected into an exhaust section of the combustion engine 10.

Figure 2:
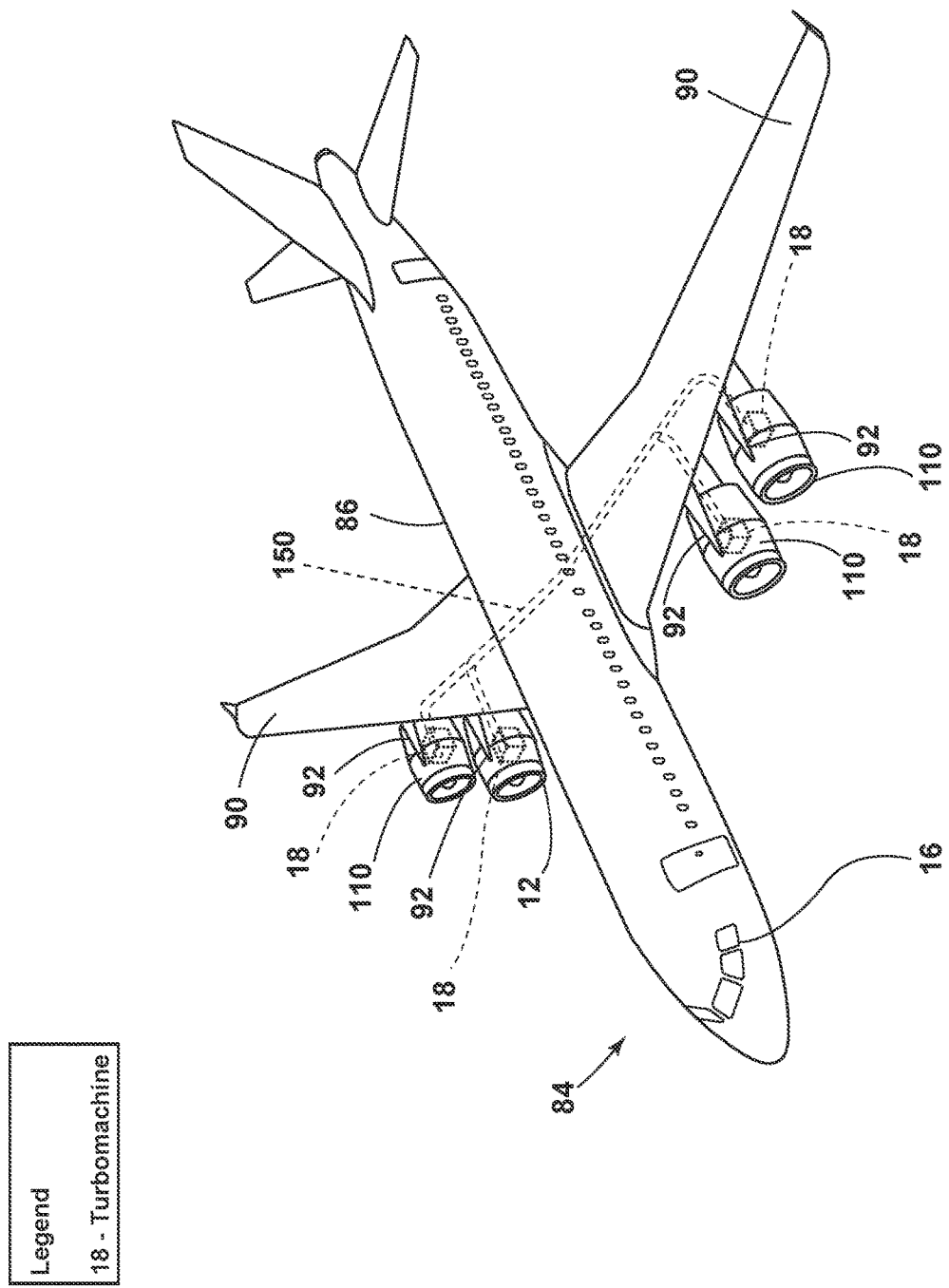
FIG. 2 is a perspective view of an aircraft including an exemplary combustion engine including the turbomachine FIG. 1, according to various aspects described herein.

FIG. 2 illustrates a set of exemplary combustion engines, specifically a set of gas turbine engines 110 provided on an aircraft 84. The set of gas turbine engines 110 are each similar to the combustion engine 10; therefore, like parts will be identified with like numerals in the 100 series, with it being understood that the description of the like parts of combustion engine 10 applies to the set of gas turbine engines 110 unless otherwise noted.

The aircraft 84 can include the set of gas turbine engines 110, a fuselage 86, a cockpit 88 positioned in the fuselage 86, and wing assemblies 90 extending outward from the fuselage 86. Each gas turbine engine 110 can include a corresponding turbomachine 18 integrally formed within the gas turbine engine 110. An exemplary external system, specifically an ECS 150, is schematically illustrated in a portion of the fuselage 86 of the aircraft 84 for illustrative purposes only. The ECS 150 can be fluidly coupled to at least a portion of the set of gas turbine engines 110.

It is contemplated that the fluid coupling of the ECS 150 to at least a portion of the gas turbine engine 110 can provide a coolant source to the ECS 150, a source of power, or a source of bleed air from the gas turbine engine 110. For example, a bleed air system can be fluidly coupled to at least a portion of the gas turbine engine 110 to provide a high temperature, high pressure, low pressure, low temperature, or a combination thereof source of air. This air can be used within the aircraft 84 for environmental control of the aircraft 84. Alternatively, it is contemplated that ambient air can be used within the aircraft 84 for environmental control of the aircraft 84. As used herein, the environmental control of the aircraft 84, that is, the ECS 150 of the aircraft 84, can include subsystems for anti-icing or de-icing a portion of the aircraft, for pressurizing the cabin or fuselage, heating or cooling the cabin or fuselage 86, and the like. The operation of the ECS 150 can be a function of at least one of the number of aircraft passengers, aircraft flight phase, or operational subsystems of the ECS 150. Examples of the aircraft flight phase can include, but is not limited to ground idle, taxi, takeoff, climb, cruise, descent, hold, and landing.

An engine pylon 92 can be included with each gas turbine engine 110 of the set of gas turbine engines 110. The engine pylon 92 can operatively couple a corresponding gas turbine engine 110 to the respective wing assembly 90.

While a commercial aircraft 84 has been illustrated, it is contemplated that embodiments of the invention can be used in any type of aircraft 84. Further, while two gas turbine engines 110 have been illustrated on each wing of the wing assemblies 90, it will be understood that any number of gas turbine engines 110 mounted on the wing assemblies 90, or even a single gas turbine engine mounted in the fuselage 86 can be included.

Figure 3:
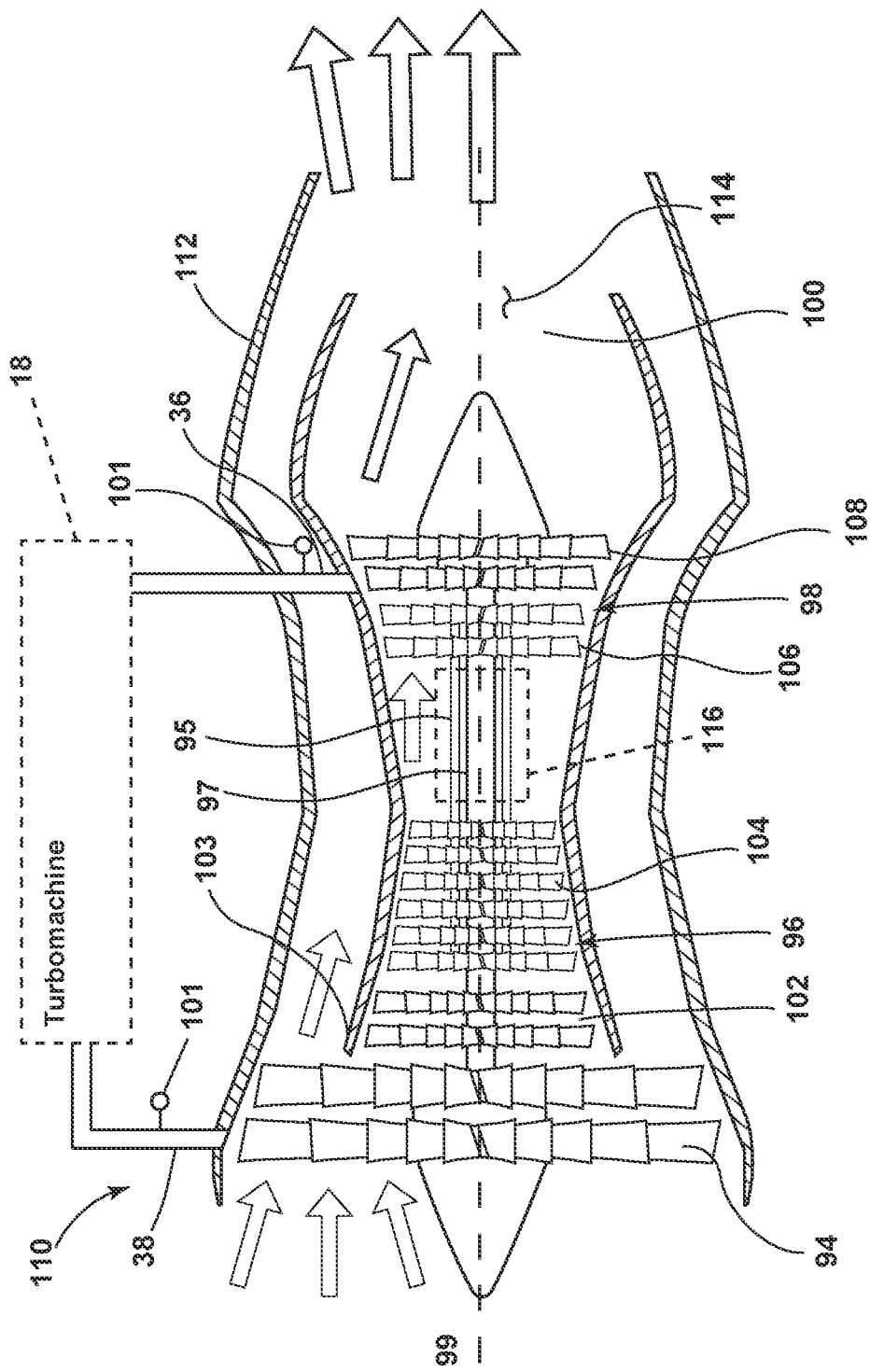
FIG. 3 is a schematic cross-sectional view of a portion of the exemplary combustion engine of FIG. 2, according to various aspects described herein.

FIG. 3 illustrates a cross section of the gas turbine engine 110 of the aircraft 84 of FIG. 2. The gas turbine engine 110 can include, in a serial relationship, a fan section 94 including a fan, a compressor section 96, a combustion section 116, a turbine section 98, and an exhaust section 100. The compressor section 96 can include, in a serial relationship, a multi-stage low pressure (LP) compressor 102, and a multi-stage high pressure (HP) compressor 104. The turbine section 98 can include, in a serial relationship, a multi-stage high-pressure (HP) turbine 106, and a multi-stage low-pressure (LP) turbine 108.

A drive shaft can operatively couple at least an upstream portion of the gas turbine engine 110 to a downstream portion of the gas turbine engine 110. It will be appreciated that the combustion section 116 can include a combustion chamber similar to the combustion chamber 16 (FIG. 1). It will be yet further appreciated that as used herein, the term "upstream portion" and "downstream portion" is analogous to upstream portion 20 and downstream portion 22 of the combustion engine 10 (FIG. 1), respectively, in that the upstream portion of the gas turbine engine 110 is upstream the combustion section 116 and the downstream portion of the gas turbine engine 110 is downstream the combustion section 116. An HP shaft or HP spool 95 disposed coaxially about a centerline 99 of the gas turbine engine 110 drivingly connects the HP turbine 106 to the HP compressor 104, and an LP shaft or LP spool 97, which is disposed coaxially about the centerline 99 of the gas turbine engine 110 within the larger diameter annular HP spool 95, drivingly connects the LP turbine 108 to the LP compressor 102 and the fan of the fan section 94. The HP and LP spools 95, 97 are rotatable about the engine centerline 99.

The first bleed air supply 36 can be configured to pull, draw, or receive bleed air from an upstream portion of the gas turbine engine 110 such as, but not limited to, the fan section 94, at least a portion of the compressor section 96, or a portion upstream of the fan section 94 such that it is configured to receive ambient air. The second bleed air supply 38 can be configured to pull, draw, or receive bleed air from a downstream portion of the gas turbine engine 110 such as, but not limited to, a portion of the combustion section 116 in which combustion has already occurred, at least a portion the turbine section 98, or the exhaust section 100. Although illustrated as first and second bleed air supplies 36, 38 it will be appreciated that the first and second bleed air supplies 36, 38 can be included within a set of bleed air supplies configured to draw air from various portions of the gas turbine engine 110. The first and second bleed air supplies 36, 38 are illustrated to be coupled with various sensors 101, which can provide corresponding output signals. By way of non-limiting example, the sensors 101 can include one or more of temperature sensors, flow rate sensors, or pressure sensors. It is further contemplated that one or more of the bleed air supplies can include a bleed air supplies from an auxiliary power units (APU) or ground cart units (GCU) such that the APU or GCU can provide an augmented pressure and conditioned temperature airflow in addition to or in place of the first or second bleed air supplies 36, 38. The first and second bleed air supplies 36, 38 can be fluidly coupled to at least a portion of the turbomachine 18 (shown schematically as a dotted box exterior the gas turbine engine 110). It is contemplated that the first and second bleed air supplies 36, 38 can be configured to supply air from two or more portions of the gas turbine engine 110 to at least a portion of the turbomachine 18.

The gas turbine engine 110 can further include a nacelle 112 or housing defining an interior 114 of the gas turbine engine 110. It will be appreciated that the nacelle 112 can be integrally formed with or include the engine pylon 92 (FIG. 1). As discussed herein, although schematically illustrated as being received exterior the gas turbine engine 110, the turbomachine 18 can be provided within any portion of the interior 114 of the gas turbine engine 110. For example, the turbomachine 18 and its accompanying components can be at least partially provided within the nacelle 112, the engine pylon 92 or any other suitable component of the gas turbine engine 110. It is yet further contemplated that at least a portion of the turbomachine 18 can be mechanically coupled to at least a portion of the gas turbine engine 110. For example, a portion of the turbomachine 18 can be coupled to a drive shaft (e.g., the LP or HP spools 95, 97) of the gas turbine engine 110. As such, the rotation of the drive shaft can drive at least a portion of the turbomachine 18.

In operation, the airflow exiting the fan section 94 is split such that a portion of the airflow is channeled into the compressor section 96, specifically through the LP compressor 102, which then supplies a pressurized airflow to the HP compressor 104, which further pressurizes the air. The remaining portion of the air split at the fan section 94 can go through a bypass air duct 103 which can be funneled into a portion of the gas turbine engine 110 downstream the fan section 94 (e.g., the turbine section 98 to cool at least a portion of the turbine section 98) or otherwise mix with the engine exhaust gases in the exhaust section 100. The pressurized airflow from the HP compressor 104 is mixed with fuel in the combustor section 116 and ignited, thereby generating combustion gases or engine exhaust gases. Some work is extracted from these combustion gases by the turbine section 98, specifically the HP turbine 106, which drives the HP compressor 104. The combustion gases are discharged into the LP turbine 108, which extracts additional work to drive the LP compressor 102, and the engine exhaust gas is ultimately discharged from the gas turbine engine 110 via the exhaust section 100. The driving of the LP turbine 108 drives the LP spool 97 to rotate the fan section 94 and the LP compressor 102. The driving of the HP turbine 106 drives the HP spool 95 to rotate the HP compressor 104.

Air from the upstream portions of the gas turbine engine 110, specifically air from the fan section 94 can be provided to at least a first portion of the turbomachine 18 via the first bleed air supply 36, while air from the downstream portions of the gas turbine engine 110, specifically the LP turbine 108 can be provided to at least a second portion of the turbomachine 18 via the second bleed air supply 38. As such a first airflow defined as a low-pressure, low-temperature air flow can be provided to the turbomachine 18 via the first bleed air supply 36, and a second airflow defined as a high-pressure, high-temperature airflow can be provided to the turbomachine 18 via the second bleed air supply 38.

Figure 4:
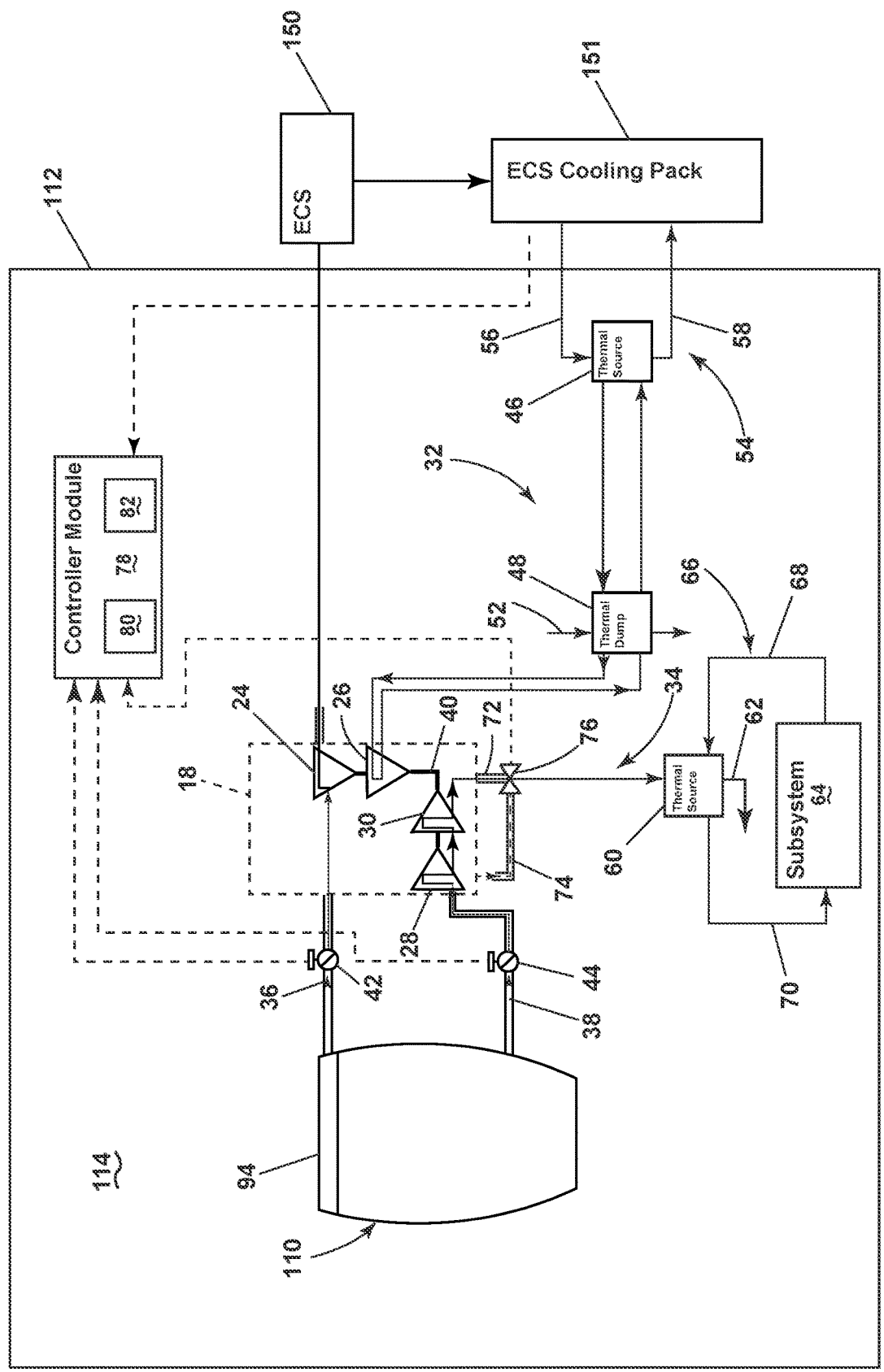
FIG. 4 is a schematic view of the turbomachine of the exemplary combustion engine of FIG. 2 further including a first thermal bus and a second thermal bus according to various aspects described herein.

FIG. 4 illustrates a schematic view of the gas turbine engine 110 of FIG. 2 including the turbomachine 18, the first thermal bus 32, and the second thermal bus 34.

Although illustrated as exterior the gas turbine engine 110, it will be appreciated that the turbomachine 18, the first and second bleed air supplies 36, 38, the first thermal bus 32, and the second thermal bus 34 can be received within the interior 114 defined by the nacelle 112. It will be further appreciated any of the turbomachine 18, the first and second bleed air supplies 36, 38, the first thermal bus 32, or the second thermal bus 34 can be received within any other suitable portion of the gas turbine engine 110. For example, the turbomachine 18, the first and second bleed air supplies 36, 38, the first thermal bus 32, or the second thermal bus 34 can be received within or otherwise integrated with the drive shaft of the gas turbine engine 110, the engine pylon 92, the nacelle 112, or any other portions formed within the interior 114 of the gas turbine engine 110. Specifically, at least one of the thermal source 46 or the thermal dump 48 can be provided or located in the engine pylon 92 of the gas turbine engine 110. Alternatively, the thermal dump 48 can be provided or located in the fan section 94 of the gas turbine engine 110 and be directly fluidly coupled to the fan section 94 such that the ambient airflow 52 is defined as the fluid flow within the fan section 94. The second thermal bus 34, specifically the thermal source 60, on the other hand, can be provided or located in a at least a portion of the turbine section 98 or the exhaust section 100. Specifically, the thermal source 60 can be provided in a late stage of the LP turbine 108.

As discussed herein, the first and second bleed air supplies 36, 38 can be fluidly coupled to at least a portion of the turbomachine 18 by way of the first valve 42, and the second valve 44, respectively. In one aspect, the first and second valves 42, 44 can be arranged to supply the low-pressure, low-temperature and high-pressure, high-temperature bleed air to one or more portions of the turbomachine 18. Specifically, the first valve 42 can supply air from the fan section 94, or another upstream portion of the gas turbine engine 110, to the compressor 24, while the second valve 44 can supply air from the turbine section 98 or exhaust section 100 to the first turbine 28. As discussed herein, the fluid provided directly to the compressor 24 and the first turbine 28 from the first bleed air supply 36 and the second bleed air supply 38, respectively, can further be defined by the presence or absence of engine exhaust gases. Specifically, the fluid provided to the first turbine 28 can include engine exhaust gases as it is fluidly coupled, through the second bleed air supply 38, to a downstream portion of the gas turbine engine 110 (e.g., the turbine section 98, or the exhaust section 100), while the compressor 24 is fluidly coupled, through the first bleed air supply 36, to an upstream portion of the gas turbine engine 110 (e.g., the fan section 94, upstream the fan section 94, the compressor section 96, or within the bypass air duct 103). Specifically, the first bleed air supply 36 can be fluidly coupled to at least a portion of the fan section 94, while the second bleed air supply 38 can be fluidly coupled to at least a portion of the LP turbine 108.

As illustrated, the compressor 24 can be directly fluidly coupled to the ECS 150 defined as an exemplary external system. The fluid coupling of the ECS 150 and the compressor 24 can provide a low-pressure, low-temperature, engine exhaust gas free fluid flow which can be used as the environmental air supply of the ECS 150. In other words, the air provided to the ECS 150 can ultimately be used by the ECS 150 as an air supply for the cabin or cockpit of the aircraft 84. It is contemplated that the ECS 150 can further include an ECS cooling pack 151 configured to cool the environmental air supply before being sent into the cabin or cockpit of the aircraft 84. The ECS cooling pack 151 can be fluidly coupled to the thermal source 46 through the external system fluid flow 56. As such, the ECS cooling pack 151 can direct at least a portion of the environmental air supply through the thermal source 46 to define the first fluid flow 56, which can subsequently be cooled by or otherwise dump heat from the environmental air supply into the heat transfer fluid of the first thermal bus 32. The environmental air supply, now cooled through the transfer of heat from the first fluid flow 56 to the first thermal bus 32, can be directed back into the ECS cooling pack 151 to define the second fluid flow 58. The second fluid flow 58 can ultimately define the environmental air supply that is supplied to the environment that the ECS 150 is fluidly coupled to. It is contemplated that the second fluid flow 58 can be defined by a temperature selected by the ECS 150. For example, if the ECS 150 is configured to supply the environmental air supply to the cabin of the aircraft 84 where it can come into contact with the passengers, pilot, or flight crew of the aircraft 84, the second fluid flow 58 can be defined by a temperature that is comfortable to the passengers, pilot, or flight crew.

It will be appreciated that any one or more of the thermal source 46, the thermal dump 48, or the thermal source 60 can be additively manufactured. It is contemplated that at least a portion of the gas turbine engine 110 (e.g., the nacelle 112, the turbomachine 18, or the engine pylon 92) can be additively manufactured and be joined with or otherwise coupled to other components which are not additively manufactured or fused with other additively manufactured components. Additionally, or alternatively, it will be appreciated that any one or more of the thermal source 46, the thermal dump 48, or the thermal source 60 can be additively manufactured integrally with at least a portion of the gas turbine engine 110 or the turbomachine 18. For example, the thermal source 46 and at least a portion of the engine pylon 92 can be additively manufactured as a single, continuous or integral component.

The aircraft 84 can further include the controller module 78 having the processor 80 and the memory 82. The controller module 78 or processor 80 can be operably or communicatively coupled to various portions of the system described herein such as, for example, at least a portion of the ECS 150, the sensors 101 (FIG. 3), the first and second valves 42, 44, the mixing valve 76, or the like. It will be further appreciated that additional sensors 101 can be provided throughout the aircraft 84 such that the data from the sensors can be used by the controller module 78 to operate at least a portion of the gas turbine engine 110. For example, a flow rate sensor can be provided within a portion of the ECS 150 that is directly fluidly coupled to the compressor 24. The controller module 78 can utilize the measurements from the flow rate sensor to determine if more or less air is needed to be supplied to the ECS 150. If more air is desired, the controller module 78 can selectively supply a greater volume of air to the compressor 24 and ultimately to the ECS 150 by further opening the first valve 42. The controller module 78 or processor 80 can further be configured to run any suitable programs. Non-limiting embodiments of the disclosure can be included wherein, for example, the controller module 78 or processor 80 can also be connected with other controllers, processors, or systems of the aircraft 84, or can be included as part of or a subcomponent of another controller, processor, or system of the aircraft 84. In one example, the controller module 78 can include a full authority digital engine or electronics controller (FADEC), an onboard avionic computer or controller, or a module remoted located by way of a common data link or protocol.

Benefits of the present disclosure include a method suitable for cooling one or more subsystems or external systems of a combustion engine, specifically a gas turbine engine, when compared to conventional method to cool one or more subsystems or external systems of a gas turbine engine. For example, conventional methods of cooling an external system, such as the ECS, can require a RAM air scoop somewhere on the aircraft. The RAM air scoops as currently used include a RAM air inlet and RAM air outlet. Cool and pressurized air can enter the RAM air inlet and flow over an ECS heat exchanger located within or otherwise in thermal communication with the RAM air scoop. The air which flows over the ECS heat exchanger can act as a thermal source or otherwise draw heat from a hot fluid of the ECS, and exit through the RAM air outlet as heated air. The RAM air scoop can include various negative impacts on the aircraft such as, but not limited to, an increased weight, increased drag, or an increased thermal emission. The gas turbine engine as described herein, however, is fully integrated within the gas turbine engine such that the RAM air scoop can be fully eliminated or otherwise reduced in size. Specifically, the implementation of the first thermal bus utilizes the thermal source and the thermal dump to effectively cool the ECS without the need of a RAM air scoop.

The first thermal bus utilizes the thermal source to draw heat from the ECS and the thermal dump method to offload or dump a portion of the thermal energy from the heat transfer fluid within the first thermal bus that it gained from drawing heat from the ECS. Both the thermal dump and the thermal source are located entirely within the interior of the gas turbine engine with the thermal dump provided within and fluidly coupled to the fan section and the thermal source being located in the engine pylon of the gas turbine engine. Both are able to be used to effectively cool the ECS without the need of various other sources of cooling air that would have otherwise came from the air within the RAM air scoop. With the RAM air scoop eliminated, the overall weight of the aircraft is reduced, thus increasing the overall efficiency of the aircraft. Further, the drag caused by the RAM air scoop can be eliminated thus increasing the aerodynamic efficiency of the aircraft. Finally, the thermal emissions associated with the RAM air scoop can also be eliminated. Further, it is contemplated that the methods of cooling the one more subsystems or external systems of the gas turbine engine as described herein, can provide for an aircraft, specifically a commercial aircraft, configured for supersonic travel.

Further benefits of the cooling systems described herein include the optimization of source of the heat transfer fluid within a corresponding thermal bus and the utilization of waste heat when compared to conventional cooling systems. For example, traditional combustion engines, specifically traditional gas turbine engines, include the turbine section and exhaust section which eject the engine exhaust gases to the atmosphere. These exhaust gases are normally wasted and ejected to the atmosphere as they have a high temperature and are otherwise contaminated from the combustion gases of the combustion section. Specifically, the engine exhaust gases can contain SCo2. If these gases were to be used in the cooling of other systems (e.g., the ECS), SCo2 could potentially get into environmental air supply which is otherwise undesirable. The cooling system described herein, however, provides the ECS with an airflow without engine exhaust gases and further draws heat from the ECS or other external systems through a non-contaminated coolant while still ensuring that the engine exhaust gases that would otherwise best wasted are still used in the driving of the turbomachine and the cooling of other various subsystems or external system of the gas turbine engine that are not sensitive to the contamination of SCo2. Specifically, the heat transfer fluid of the first thermal bus can be further defined as a liquid heat transfer fluid. As the heat transfer fluid is a liquid, the heat transfer fluid does not pick up contaminates as it is pumped through the first thermal bus by the rotary pump. In regards to the engine exhaust gases that would otherwise be wasted, the second thermal bus can utilize the engine exhaust gases to draw heat from a subsystem of the gas turbine engine that is not sensitive to engine exhaust gases. As such, the engine exhaust gases can be used to cool a suitable subsystem of the gas turbine engine instead of going to waste. The heat transfer fluids for both the first and second thermal busses are optimized in the sense that they are best suited for the subsystem or external system in which they are cooling. As such, the cooling systems described herein allow for the optimization of the coolant source while also ensuring the engine exhaust gases that would otherwise be wasted are used to cool subsystems of the gas turbine engine.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure herein, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A combustion engine comprising at least one combustion chamber, a first bleed air supply fluidly coupled to a portion of the combustion engine upstream of the combustion chamber, a second bleed air supply fluidly coupled to a portion of the combustion engine downstream of the combustion chamber, a first thermal bus including a thermal source and a thermal dump fluidly coupled to one another and through which a heat transfer fluid flows, and a turbomachine comprising a compressor, a rotary pump, and a first turbine mounted to a common shaft, with the compressor and the rotary pump in serial flow arrangement, wherein the compressor is fluidly coupled to the first bleed air supply, the first turbine is fluidly coupled to the second bleed air supply, and the rotary pump is fluidly coupled to the first thermal bus to pump a heat transfer fluid through the first thermal bus from the thermal source to the thermal dump.

The combustion engine of any preceding clause, wherein the turbomachine is fully integrated within the combustion engine.

The combustion engine of any preceding clause, wherein the combustion engine further comprises a housing and the turbomachine is located within an interior defined by the housing.

The combustion engine of any preceding clause, wherein at least one of the thermal source or the thermal dump is located within the combustion engine.

The combustion engine of any preceding clause, wherein the thermal source is fluidly coupled to at least a portion of an external system.

The combustion engine of any preceding clause, wherein the external system is an Environmental Control System (ECS) and the thermal source is configured to draw heat away from at least a portion of the ECS.

The combustion engine of any preceding clause, wherein the thermal dump is located within the combustion engine.

The combustion engine of any preceding clause, wherein the thermal dump is fluidly coupled to ambient air of the combustion engine.

The combustion engine of any preceding clause, further comprising a housing defining an interior, with the turbomachine, the thermal source, the thermal dump, and the first thermal bus all located within an interior of the housing.

The combustion engine of any preceding clause, wherein a second turbine is mounted to the common shaft and the first and second turbines are fluidly coupled to an engine exhaust such that an engine exhaust gas rotates the common shaft.

The combustion engine of any preceding clause, further comprising a second thermal bus fluidly coupled to the second turbine such that the engine exhaust gas exiting the second turbine functions as a heat transfer fluid for the second thermal bus.

The combustion engine of any preceding clause, wherein the turbomachine further comprises a fluid bypass from the first turbine to the engine exhaust gas exiting the second turbine, with the fluid bypass having a mixing valve to mix the engine exhaust gas exiting the first turbine with the engine exhaust gas exiting the second turbine to control a temperature of the engine exhaust gas functioning as the heat transfer fluid for the second thermal bus.

An aircraft comprising a gas turbine engine having a fan section, compressor section, combustor section, and turbine section in axial flow arrangement, a first bleed air supply fluidly coupled to a portion of the combustion engine upstream the combustor section, a second bleed air supply fluidly coupled to a portion of the combustion engine downstream the combustor section, a first thermal bus including a thermal source and a thermal dump fluidly coupled to one another and through which a heat transfer fluid flows, and a turbomachine comprising a compressor, a rotary pump, and a first turbine mounted to a common shaft, with the compressor and the rotary pump in serial flow arrangement, wherein the compressor is fluidly coupled to the first bleed air supply, the first turbine is fluidly coupled to the second bleed air supply, and the rotary pump is fluidly coupled to the first thermal bus to pump a heat transfer fluid through the first thermal bus from the thermal source to the thermal dump.

The aircraft of any preceding clause, wherein the gas turbine engine further comprises a nacelle and the turbomachine is located within an interior defined by the nacelle.

The aircraft of any preceding clause, further comprising an engine pylon carrying the gas turbine engine and at least one thermal source or the thermal dump is located in the engine pylon.

The aircraft of any preceding clause, wherein the thermal source is located within the engine pylon and the thermal dump is located within the fan section.

The aircraft of any preceding clause, wherein turbomachine further comprises a second turbine mounted to the common shaft, with the first and second turbines are fluidly coupled to a turbine exhaust such that a turbine exhaust gas rotates the common shaft.

The aircraft of any preceding clause, further comprising a second thermal bus fluidly coupled to the second turbine such that the turbine exhaust gas exiting the second turbine functions as heat transfer fluid for the second thermal bus.

The aircraft of any preceding clause, wherein the turbomachine further comprises a fluid bypass from the first turbine to the exhaust gas exiting the second turbine, with the fluid bypass having a mixing valve to mix the exhaust gas exiting the first turbine with the exhaust gas exiting the second turbine to control a temperature of the exhaust gas functioning as heat transfer fluid for the second thermal bus.

The aircraft of any preceding clause, wherein the first bleed air supply is coupled to one either the fan section or compressor section, and the second bleed air supply is coupled to one of either the turbine section or exhaust section.

A combustion engine comprising at least one combustion chamber, a first bleed air supply fluidly coupled to a portion of the combustion engine upstream of the combustion chamber, a second bleed air supply fluidly coupled to a portion of the combustion engine downstream of the combustion chamber, a thermal bus including a thermal source and a thermal dump fluidly coupled to one another, with the thermal dump being downstream the thermal source, and through which a heat transfer fluid flows, and a turbomachine comprising a compressor, a compressor, a first turbine, and a second turbine mounted to a common shaft, with the first and second turbines in serial flow arrangement, wherein the compressor is fluidly coupled to the first bleed air supply, the first turbine is fluidly coupled to the second bleed air supply, and the second turbine is fluidly coupled to the thermal bus, and wherein the heat transfer fluid is an engine exhaust gas from the second bleed air supply that flows through at least one of the first turbine or the second turbine.

The combustion engine of any preceding clause, wherein the thermal source is fluidly coupled to a subsystem of the combustion engine.

The combustion engine of any preceding clause, wherein the subsystem comprises at least one of a fuel system or an oil system for the combustion engine.

The combustion engine of any preceding clause, further comprising a fluid bypass between the first turbine and the second turbine such that at least a portion of an engine exhaust gas within the first turbine can bypass the second turbine.

The combustion engine of any preceding clause, wherein the fluid bypass includes a mixing valve to mix the engine exhaust gas from the first turbine within the fluid bypass, with an engine exhaust gas existing the second turbine, and wherein the mixing valve can control at least one of a temperature or a pressure of the engine exhaust gas based on a ratio of the engine exhaust gas from the first turbine to the engine exhaust gas from the second turbine.

The combustion engine of any preceding clause, wherein the mixing valve comprises a variable flow rate mixing valve.

The combustion engine of any preceding clause, further comprising a valve fluidly coupling the second bleed air supply to the first turbine.

The combustion engine of any preceding clause wherein the valve is a variable flow rate valve.

The combustion engine of any preceding clause, wherein the thermal dump includes a thermal bus exhaust that exhausts the engine exhaust gas in the thermal bus to atmosphere.

The combustion engine of any preceding clause, further comprising a rotary pump downstream of and in serial flow arrangement with the compressor and mounted to the common shaft.

The combustion engine of any preceding clause, further comprising a housing, with the turbomachine entirely located within an interior of the housing.

The combustion engine of any preceding clause, further comprising a housing, with the thermal bus and the thermal dump located entirely within an interior of the housing.

An aircraft comprising a turbine engine having a fan section, compressor section, combustor section, and turbine section in axial flow arrangement, a first bleed air supply fluidly coupled to a portion of the turbine engine upstream of the combustor section, a second bleed air supply fluidly coupled to a portion of the turbine engine downstream of the combustor section, a thermal bus including a thermal source and a thermal dump fluidly coupled to one another, with the thermal dump being downstream the thermal source, and through which a heat transfer fluid flows, and a turbomachine comprising a compressor, a first turbine, and a second turbine mounted to a common shaft, with the first and second turbines in serial flow arrangement, wherein the compressor is fluidly coupled to the first bleed air supply, the first turbine is fluidly coupled to the second bleed air supply, and the second turbine is fluidly coupled to the thermal bus, and wherein the heat transfer fluid is an engine exhaust gas from the second bleed air supply that flows through at least one of the first turbine or the second turbine.

The aircraft of any preceding clause, wherein the thermal source is fluidly coupled to at least one of a fuel system or oil system for the turbine engine.

The aircraft of any preceding clause, further comprising a fluid bypass between the first turbine and the second turbine such that at least a portion of an engine exhaust gas within the first turbine can bypass the second turbine.

The aircraft of any preceding clause, wherein the fluid bypass includes a mixing valve to mix the engine exhaust gas from the first turbine within the fluid bypass, with an engine exhaust gas existing the second turbine, and wherein the mixing valve can control at least one of a temperature or a pressure of the engine exhaust gas based on a ratio of the engine exhaust gas from the first turbine to the engine exhaust gas from the second turbine.

The aircraft of any preceding clause, further comprising a valve fluidly coupling the second bleed air supply to the first turbine.

The aircraft of any preceding clause, wherein the thermal dump is a thermal bus exhaust that exhausts the engine exhaust gas in the thermal bus to atmosphere.

The aircraft of any preceding clause, further comprising a rotary pump downstream of and in serial flow arrangement with the first compressor and mounted to the common shaft.

The aircraft of any preceding clause, wherein the thermal bus and the thermal dump are located within an interior of the turbine engine.

What is claimed is:
1. A combustion engine comprising:
at least one combustion chamber including a combustion gas;
a first bleed air supply fluidly coupled to a first fluid from a portion of the combustion engine that is upstream of the combustion chamber;
a second bleed air supply fluidly coupled to a second fluid from a portion of the combustion engine that is downstream of the combustion chamber, the second fluid including at least a portion of the combustion gas;
a first thermal bus including a first thermal source and a thermal dump provided downstream of the first thermal source, the first thermal bus including a first heat transfer fluid, the first thermal bus being fluidly coupled to a system external the combustion engine;
a second thermal bus, separate from the first thermal bus, including a second thermal source and a thermal bus exhaust fluidly coupled with and provided downstream of the second thermal source, the second thermal bus being fluidly coupled to a second heat transfer fluid, separate from the first heat transfer fluid; and
a turbomachine comprising;
a compressor fluidly coupled to the first bleed air supply, the first fluid at least partially defining a working fluid within the compressor, the compressor coupled to a portion of the first thermal bus such that the compressor pumps the first heat transfer fluid through the first thermal bus, the first heat transfer fluid being separate from the working fluid; and a turbine fluidly coupled to both of the second bleed air supply and the second thermal bus, with the second heat transfer fluid being at least a portion of the second fluid that flows through the turbine.

2. The combustion engine of claim 1, wherein the second thermal source is fluidly coupled to a subsystem of the combustion engine.

3. The combustion engine of claim 2, wherein the subsystem comprises at least one of a fuel system or an oil system for the combustion engine.

4. The combustion engine of claim 1, wherein the turbine includes a fluid bypass between an upstream portion and a downstream portion of the turbine such that at least a portion of the second fluid within the turbine can bypass a portion of the turbine between the upstream portion and the downstream portion.

5. The combustion engine of claim 4, wherein the fluid bypass includes a mixing valve to mix the at least a portion of the second fluid as from the upstream portion, with at least a portion of the second fluid from the downstream portion, and wherein the mixing valve controls at least one of a temperature or a pressure of the heat transfer fluid based on a ratio of the second fluid from the upstream portion to the second fluid from the downstream portion.

6. The combustion engine of claim 1, further comprising a valve fluidly coupling the second bleed air supply to the turbine.

7. The combustion engine of claim 1, wherein the thermal bus exhaust exhausts the second heat transfer fluid in the second thermal bus to atmosphere.

8. The combustion engine of claim 1, further comprising a housing, with the turbomachine entirely located within an interior of the housing.

9. The combustion engine of claim 1, further comprising a housing, with the second thermal bus and the thermal bus exhaust located entirely within an interior of the housing.

10. The combustion engine of claim 1, wherein the combustion engine is a turbine engine for an aircraft.

11. The combustion engine of claim 1, wherein the turbine includes a first turbine and a second turbine in serial flow arrangement.

12. The combustion engine of claim 11, wherein at least one of the first thermal source or the thermal dump is located within the combustion engine.

13. The combustion engine of claim 12, wherein the first thermal source is fluidly coupled to at least a portion of a system external to the combustion engine.

14. The combustion engine of claim 13, wherein the system is an Environmental Control System (ECS) and the thermal source draws heat away from at least a portion of the ECS.

15. The combustion engine of claim 12, wherein the thermal dump is located within the combustion engine.

16. The combustion engine of claim 15, wherein the thermal dump is fluidly coupled to ambient air of the combustion engine.

17. The combustion engine of claim 1, wherein the compressor of the turbomachine comprises a first compressor and a second compressor downstream of the first compressor.

18. The combustion engine of claim 17, wherein the second compressor pumps the first heat transfer fluid through the first thermal bus.

19. The combustion engine of claim 17, wherein the first compressor feeds a flow of air to an Environmental Control System thermally coupled to the first thermal bus.

20. The combustion engine of claim 1, wherein the first heat transfer fluid is a liquid coolant.

* * * * *